United States Patent
Kuku et al.

(10) Patent No.: US 9,901,876 B1
(45) Date of Patent: Feb. 27, 2018

(54) RECLAIMING USEFUL PRODUCTS FROM EXHAUST GAS CLEAN-UP SYSTEM

(71) Applicants: Lai O. Kuku, Gilbert, AZ (US);
Melvin Mathew, Tempe, AZ (US);
Michael P. Woudenberg, Phoenix, AZ (US)

(72) Inventors: Lai O. Kuku, Gilbert, AZ (US);
Melvin Mathew, Tempe, AZ (US);
Michael P. Woudenberg, Phoenix, AZ (US)

(73) Assignee: Millenium SynthFuels Corporation, Gilbert, AZ (US)

( * ) Notice: Subject to any disclaimer, the term of this patent is extended or adjusted under 35 U.S.C. 154(b) by 0 days.

(21) Appl. No.: 15/498,403

(22) Filed: Apr. 26, 2017

Related U.S. Application Data (63) Continuation-in-part of application No. 15/401,838, filed on Jan. 9, 2017.

(51) Int. Cl.
| | |
|---|---|
| *B01D 53/50* | (2006.01) |
| *B01D 53/96* | (2006.01) |
| *F01N 3/28* | (2006.01) |
| *C01B 31/20* | (2006.01) |
| *C01F 11/46* | (2006.01) |

(Continued)

(52) U.S. Cl.
CPC ........... *B01D 53/96* (2013.01); *B01D 21/262* (2013.01); *B01D 45/12* (2013.01); *B01D 53/04* (2013.01); *B01D 53/50* (2013.01); *B01D 53/75* (2013.01); *B01D 53/80* (2013.01); *B01D 53/864* (2013.01); *B01D 53/8628* (2013.01); *C01B 31/20* (2013.01); *C01F 11/185* (2013.01); *C01F 11/468* (2013.01); *C01G 13/00* (2013.01); *F01N 3/2842* (2013.01); *B01D 2251/404* (2013.01); *B01D 2251/606* (2013.01); *B01D 2252/103* (2013.01); *B01D 2252/60* (2013.01); *B01D 2253/102* (2013.01); *B01D 2255/1021* (2013.01); *B01D 2257/302* (2013.01); *B01D 2257/404* (2013.01); *B01D 2257/502* (2013.01);

(Continued)

(58) Field of Classification Search
USPC ..... 423/240, 243.01, 243, 235; 422/168–172
See application file for complete search history.

(56) References Cited

U.S. PATENT DOCUMENTS 4,625,661 A * 12/1986 Melchior .............. F23G 5/0273
110/215
5,630,991 A * 5/1997 Gal ...................... B01D 53/501
423/243.01

(Continued)

*Primary Examiner* — Nina Bhat (57) ABSTRACT

Reclaiming useful products for commercial use and/or to be reused in an exhaust gas clean-up system. This is accomplished by subjecting the power plant exhaust gas to the various cleaning fluids followed by reclaiming the useful products from the exiting cleaning liquid. As the exhaust gas passes through a medium of water and calcium carbonate in a wet scrubber, the exiting cleaning fluid contains various calcium salts. Likewise, as the exhaust gas passes through a medium of calcium hydroxide and water other calcium salts are produced. By passing these respective calcium salts through solid-liquid centrifuge separators and other separating stirred tanks, various useful products are reclaimed and reused in the process or commercially sold. Some useful products are carbon dioxide, calcium sulfate, calcium carbonate, and mercuric salts.

17 Claims, 6 Drawing Sheets

(51) Int. Cl.
  *C01F 11/18* (2006.01)
  *C01G 13/00* (2006.01)
  *B01D 45/12* (2006.01)
  *B01D 53/04* (2006.01)
  *B01D 53/80* (2006.01)
  *B01D 53/86* (2006.01)
  *B01D 21/26* (2006.01)
  *B01D 53/75* (2006.01)

(52) U.S. Cl.
  CPC .. *B01D 2257/504* (2013.01); *B01D 2257/602* (2013.01)

(56) References Cited

U.S. PATENT DOCUMENTS

| | | | | |
|---|---|---|---|---|
| 5,900,042 | A * | 5/1999 | Mendelsohn | B01D 53/14 423/107 |
| 6,676,912 | B1 * | 1/2004 | Cooper | B01D 53/56 423/235 |
| 2002/0061270 | A1 * | 5/2002 | Osborne | B01D 53/60 423/210 |
| 2008/0075647 | A1 * | 3/2008 | Cochran | B01D 53/501 423/243.06 |
| 2010/0061909 | A1 * | 3/2010 | Kawamura | B01D 53/1456 423/243.02 |
| 2011/0024680 | A1 * | 2/2011 | Via | B01D 53/64 252/182.32 |
| 2013/0028821 | A1 * | 1/2013 | Suchak | B01D 47/06 423/235 |

* cited by examiner

RECLAIMING USEFUL PRODUCTS FROM EXHAUST GAS CLEAN-UP SYSTEM

TECHNICAL FIELD

The subject design relates generally to reclaiming of useful products from an exhaust gas clean-up system and more specifically relates to a process and apparatus that reclaims products from a fossil fueled fired power plant exhaust gas clean-up system and regenerates some of the products back into the process for the gas clean-up system. This process permits the opportunity to reclaim and commercially sell some reclaimed products and to regenerate and reuse some reclaimed products in the exhaust gas clean-up process.

BACKGROUND

There have been many different arrangements that attempt to remove detrimental flue gas compositions but most of them are only partially effective in removing most if not all of the detrimental exhaust gas compositions. Many times, this is based on the extreme cost of effective types of exhaust gas clean-up systems used. This extreme cost is directly affected by high electrical power usage and the cost of the cleaning fluids used. For example, U.S. Pat. No. 7,842,264 B2 which issued Nov. 30, 2010 to Cooper et al appears to teach the use of a system having high electrical power requirement and a complex process to clean exhaust gases and save or regenerate some of the cleaning fluid components. The above noted US patent does not teach singularly or in combination the subject matter claimed herein. The subject design serves as a cost-effective solution to cleaning exhaust gases from a fossil fuel fired power plant while also reclaiming various cleaning compounds that may be reused in the cleaning or sold for commercial uses.

SUMMARY OF THE INVENTION

According to the present design, a system for reclaiming useful products from an exhaust gas clean-up system is provided. The exhaust clean-up system uses cleaning fluids such as water, calcium carbonate, and calcium hydroxide to clean exhaust gases from a fossil fuel fired power plant. A wet scrubber uses water and calcium carbonate to remove carbon dioxide and sulfur from the exhaust gases and the system for reclaiming useful products captures and stores the carbon dioxide while returning the separated water to the wet scrubber. The reclaiming system also separates and removes the sulfur in the form of calcium sulfate, along with any unused calcium carbonate, from the water and stores the calcium sulfate for commercial uses. The calcium carbonate may be returned for reuse in the wet scrubber, stored for commercial use, and/or further processed as herein after discussed. Likewise, a reaction chamber uses calcium hydroxide with water to remove any carbon dioxide and mercury remaining in the exhaust gases. In order to make the calcium hydroxide in the reaction chamber more soluble in the water, glycerol may be added to the solution used in the reaction chamber. The reclaiming system further functions to separate any glycerol form the cleaning solution and return it to the reaction chamber for reuse. In the event that any mercuric salts are still present in the exhaust gases after the exhaust gases have been passed through a cyclone separator and an activated carbon filter, the heavier mercuric salts are removed by the wet scrubber and the reaction chamber and are mixed with the cleaning solution. The reclaiming system separates the heavier mercuric salts from the cleaning solution and stores it for commercial uses.

The subject reclaiming system provides a safe, and cost effective process for reclaiming and/or reusing various compounds/elements used in the clean-up of exhaust gases from a fossil fuel fired power plant. With the subject design, power usage is held to a minimum, many compounds used in the exhaust gas clean-up are reclaimed and reused in the exhaust gas clean-up process, and many useful products/compounds may be sold for other commercial uses.

Other objects, features, and advantages of the subject design will become more apparent from the following detailed description of the following embodiment and certain modification thereof when taken together with the accompanying drawing.

DETAILED DESCRIPTION

Figure 1:
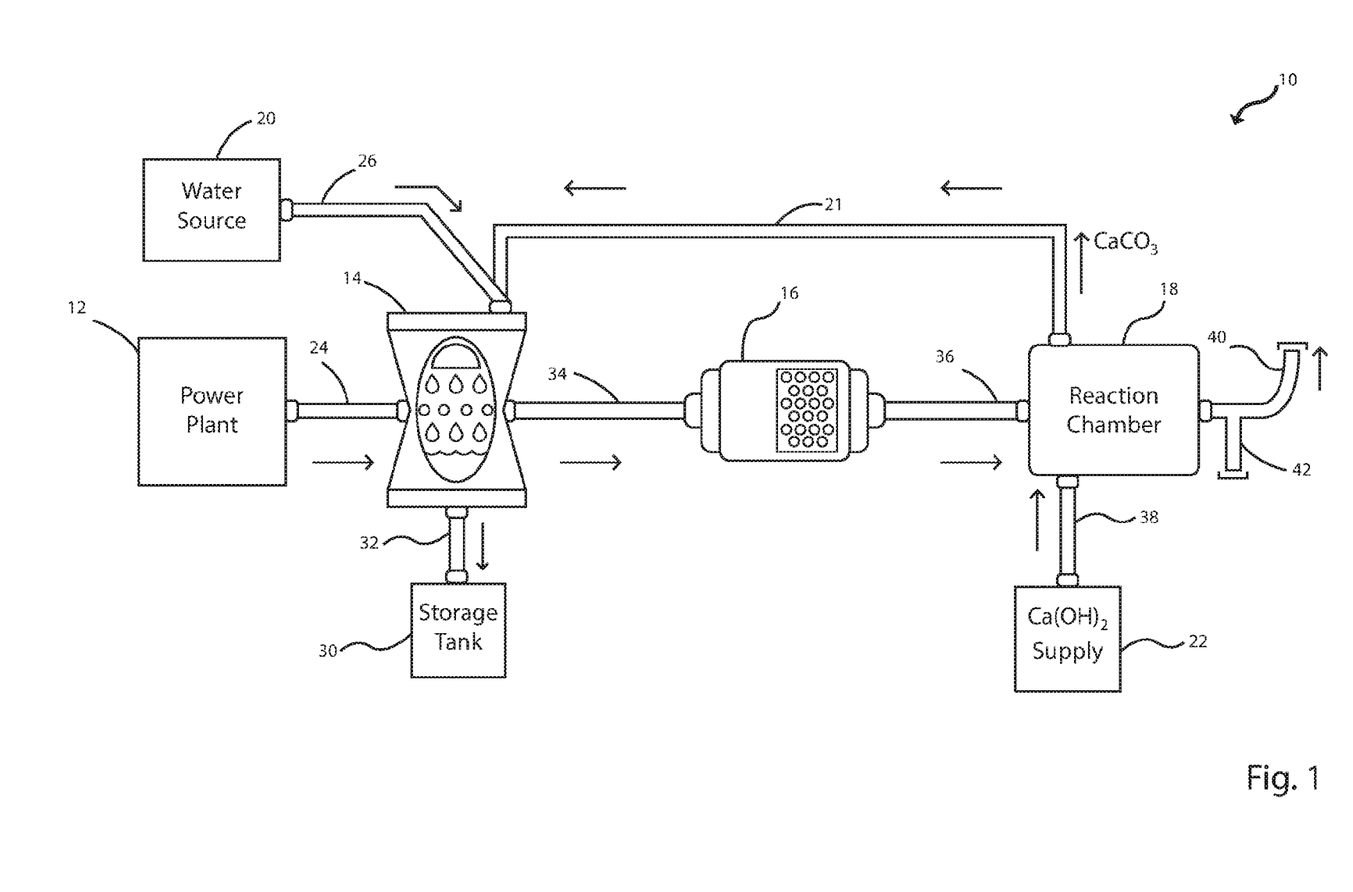
FIG. 1 is a partial flow chart and a partial diagrammatic representation of one embodiment of the subject design.

Referring to FIG. 1 of the drawings, an exhaust gas clean-up system 10 is provided. The exhaust gas clean-up system 10 is connected to the exhaust of a typical fossil fuel fired power plant 12. The exhaust gas from the fossil fuel fired power plant 12 contains various percentages of water ($H_2O$), nitrogen (N), sulfur dioxide ($SO_2$), carbon dioxide ($CO_2$), and nitrogen oxides ($NO_x$). There could be minimal amounts of carbon monoxide (CO) depending on the purity of the fossil fuel being used. The gas clean-up system 10 includes a wet scrubber 14, a catalytic converter 16, a reaction chamber 18, a source of water 20, a source of a chemically produced compound connecting line 21, and a source of reacting compound 22.

The wet scrubber 14 is connected to the exhaust of the power plant 12 by an exhaust gas connection line 24 and to the source of water 20 by a water connection line 26. The source 22 of the chemically produced compound is, in the subject arrangement, the reacting chamber 18 and is connected to the wet scrubber by a compound connection line 21. The chemical reaction within the wet scrubber 14 produces a usable by-product and acts to remove the sulfur by the chemical reaction between the sulfur dioxide in the exhaust gas, the slurry of water and calcium carbonate as seen below:

This reaction consumes calcium carbonate, water, and oxygen in order to convert sulfur dioxide into $CaSO_4(2H_2O)$ which can be utilized in various ways, for example, such as gypsum. The by-product of gypsum is directed to a holding tank 30 by a bypass line 32. This reaction cleans up the sulfur dioxide that is contained in the exhaust gas.

The chemically modified exhaust gas is now directed to the catalytic converter 16 by the converter connecting line 34 and further chemically modifies the exhaust gas. The catalytic converter 16 can be a typical catalytic converter used in most automobiles. However, a platinum converter with an internal honeycomb arrangement is more effective even though the use of the platinum converter does not depart from the essence of the subject invention. Even though the catalytic converter 16 is shown upstream of the reaction chamber 18, it is recognized that it could be located downstream of the reaction chamber 18 without departing from the essence of the subject arrangement. The catalytic converter would still function as described hereinafter.

Within the subject catalytic converter 16, the nitrogen oxides are converted into nitrogen (N) and oxygen ($O_2$). The residual carbon monoxide (CO) may be converted into carbon dioxide ($CO_2$) and water ($H_2O$). The major difference between the use of fossil fuel, as used herein, and gas fuel as used in automobiles is that the burning of fossil fuel does not produce hydrocarbons like the burning of gasoline in automobiles. The burning of gasoline is responsible for the production of large amounts of carbon monoxide (CO), which usually are not present or of trace amounts in fossil fuels. Even though catalytic converters are used in automobiles to reduce and/or remove carbon monoxide and hydrocarbons, these gasses are not present in the subject exhaust gas. If they happen to be present, they will only be in minimal amounts. At this point within the design, the nitrogen oxides ($NO_x$) and the sulfur, in the form of sulfur dioxides ($SO_2$) have been addressed and that which is left is nitrogen gas (N), water ($H_2O$), carbon dioxide ($CO_2$), and oxygen ($O_2$).

In order to eliminate carbon dioxide ($CO_2$) emissions as well as provide the wet scrubber 14 with the chemically produced compound, i.e. calcium carbonate ($CaCO_3$) and water, the further chemically modified exhaust gas is passed to the reaction chamber 18 through a reacting connection line 36. The source of reacting compound, i.e. calcium hydroxide ($Ca(OH)_2$, is introduced in the reaction chamber 18 through a reacting compound line 38.

The chemical reaction within the reaction chamber is as follows:

$$Ca(OH)_2 + CO_2 = CaCO_3 + H_2O$$

The calcium carbonate ($CaCO_3$) and water are directed from the reaction chamber 18 to the wet scrubber 14 as the source of chemically produced compound and to add water thereto also. The source of chemically produced compound and water from the reaction chamber 18 are returned through the source of compound connecting line 21. The volume of calcium carbonate and water being bypassed from the reaction chamber 18 to the wet scrubber 14 through the source of compound connecting line 21 will normally be sufficient to continue the operating process without the need of the water source 20.

At this point in the process, the final chemically modified exhaust gas can be safely emitted into the atmosphere through an exhaust line 40. Any water that is passing through the exhaust line 40 can be bypassed to a water tank 42.

Figure 2:
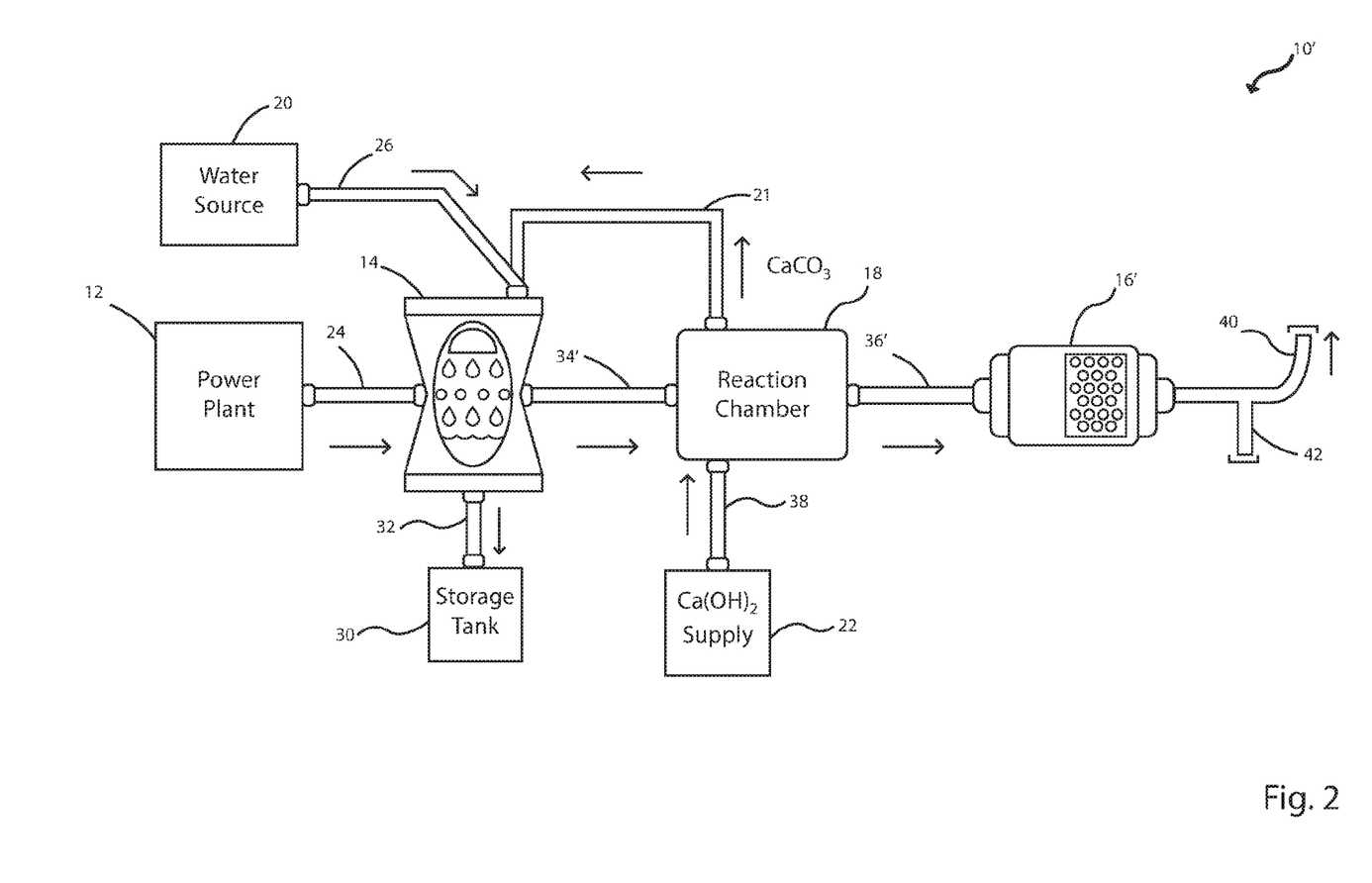
FIG. 2 is a partial flow chart and a partial diagrammatic representation of another embodiment of the subject design.

Referring to the embodiment of FIG. 2, like elements have like element numbers and moved/modified elements have like element numbers with a 'prime' symbol attached thereto.

In the embodiment of FIG. 2, the catalytic converter 16 of FIG. 1 has been moved from a location upstream of the reaction chamber 18 to a location downstream thereof between the downstream side of the reaction chamber 18 and the atmosphere. All aspects from the embodiment of FIG. 2 function in the same manner as that of FIG. 1. Since the reaction chamber 18 serves to eliminate carbon dioxide present and the catalytic converter eliminates nitrogen oxides, the exhaust gas is now safe to vent it to the atmosphere.

Figure 3:
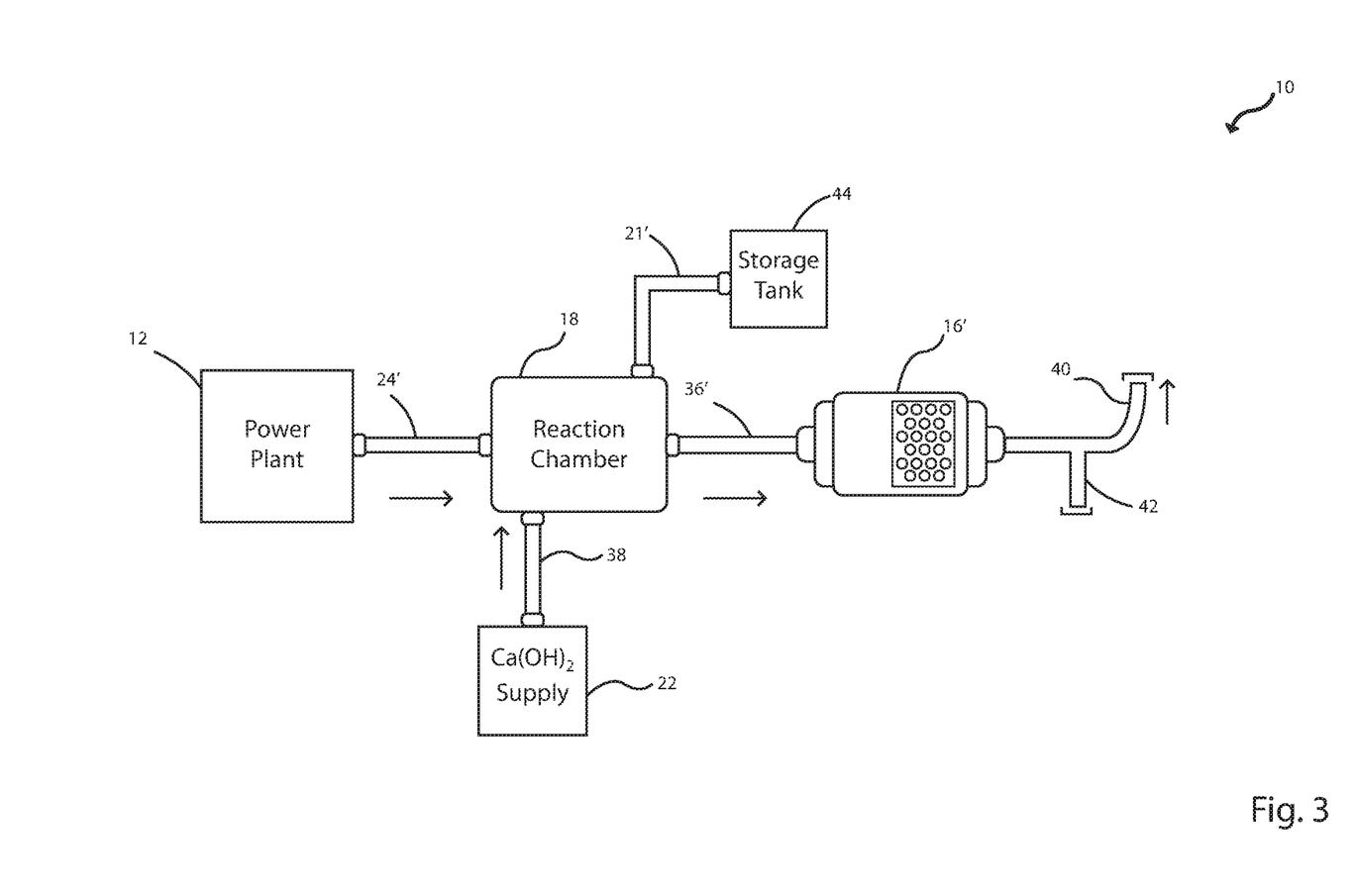
FIG. 3 is a partial flow chart and a partial diagrammatic representation of yet another embodiment of the subject design.

Referring to the embodiment of FIG. 3 as compared to FIG. 1, like elements have like element numbers and moved/modified elements have like element numbers with a 'prime' symbol attached thereto.

In the embodiment of FIG. 3, the wet scrubber 14 has been deleted and the catalytic converter 16 has been moved to a location downstream of the reaction chamber 18. The calcium carbonate ($CaCO_3$) and water being bypassed from the reaction chamber 18 in FIGS. 1 and 2 are being directed through the chemically produced compound line 21' to a storage tank 44. This calcium carbonate and water can be further processed as needed to extract calcium carbonate or to produce calcium hydroxide. The chemical reaction that was taking place in the wet scrubber 14 of FIGS. 1 and 2 is also taking place in the reaction chamber 18. Consequently, in most applications, the wet scrubber 14 is not needed. As previously noted with respect to FIG. 2, the catalytic converter 16' functions in the same manner as that described in FIG. 1 and FIG. 2.

Figure 4:
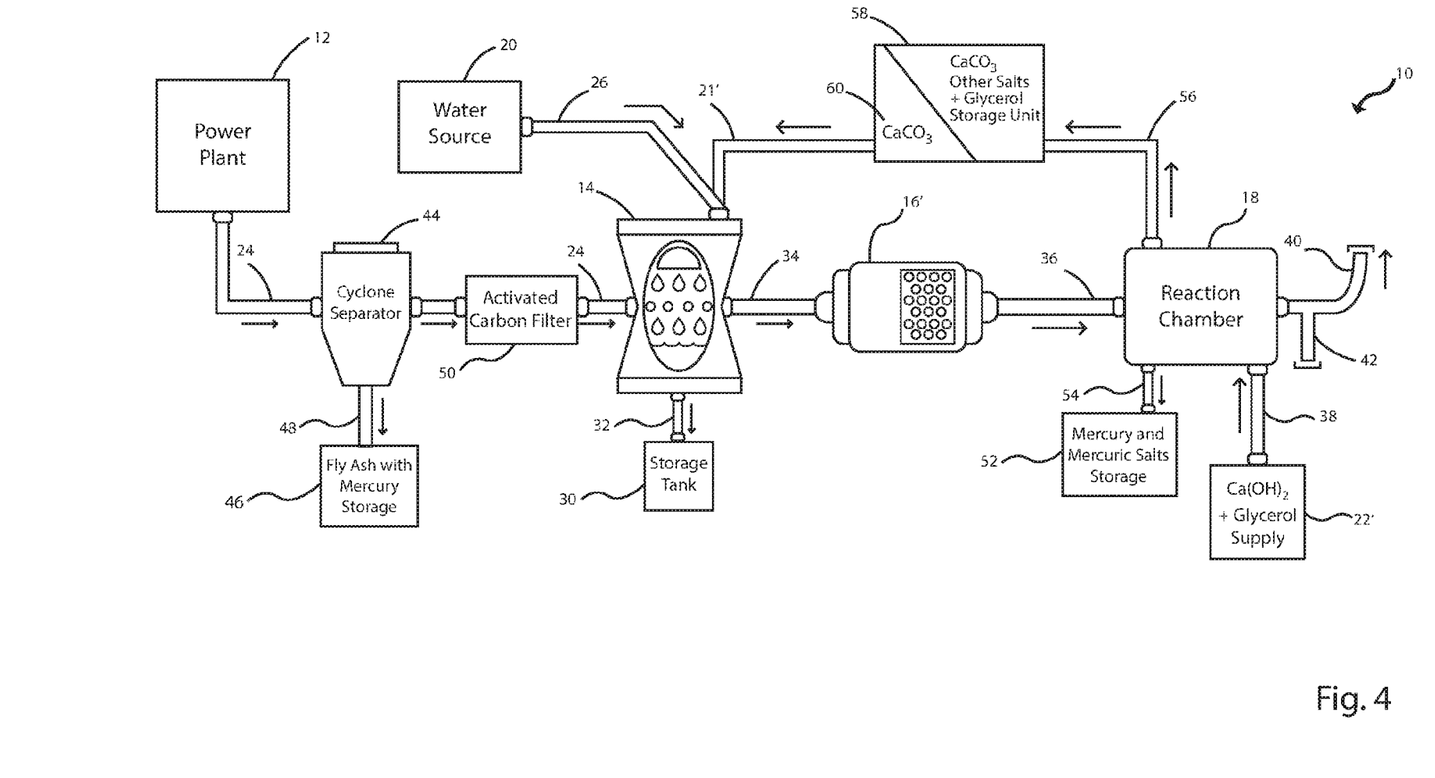
FIG. 4 is a partial flow chart and a partial diagrammatic representation of still another embodiment of the subject design.

Referring to the embodiment of FIG. 4 as compared to FIG. 1 like elements have like element numbers and moved/modified elements have a 'prime' symbol attached thereto.

In the embodiment of FIG. 4, the exhaust gases being emitted from the fossil fuel-fired power plant 12 further include 'fly ash', mercury and mercuric salts. A cyclone gas separator 44 is added downstream from the fossil fuel-fired power plant 12 and is disposed in the exhaust gas connection line 24. A 'fly ash' with mercury storage 46 is connected to the bottom of the cyclone gas separator 44 by a connection line 48. Within the cyclone gas separator 44, the coal 'fly ash' is removed from the exhaust gas stream, and the fly ash also serves as an adsorbent for mercury contained in the exhaust gas stream. At the high volumetric flow rates within the cyclone gas separator 44, the heavier 'fly ash', with the adsorbed mercury attached, falls to the bottom where it can be collected in the fly ash with mercury storage 46 through connection line 48. The cyclone gas separator 44 is effective to remove most of the 'fly ash' from the exhaust gases.

Additionally, an activated carbon filter 50 is added downstream of the cyclone gas separator 44 and is also disposed in the exhaust gas connection line 24. The activated carbon filter 50 is operative to remove any remaining 'fly ash' and in cooperation with the cyclone gas separator 44 removes about 75 percent of the mercury and mercuric salts. The partially cleaned exhaust gases continue downstream to the wet scrubber 14 and the catalytic convertor 16 to the reaction chamber 18 as previously set forth above in FIG. 1-3.

The calcium hydroxide supply ($Ca(OH)_2$) 22 of FIG. 1 is being modified in the subject embodiment of FIG. 4 and is labeled 22'. The calcium hydroxide storage 22 of FIG. 1 has a mixed portion of calcium hydroxide and a solubilizer. The solubilizer could be of various known solubilizers that are effective to enhance the solubility of the calcium hydroxide in water contained therein. Even though various solubilizers could be used herein, glycerol is the preferred solubilizer.

Furthermore, mercury and mercuric salts storage 52 are added and connected to the reaction chamber 18 by a connection line 54.

Within the reaction chamber 18, the solution, formed by the mixing of water, the calcium hydroxide, and the glycerol, interacts with the exhaust gases therein to remove all of the mercury and mercuric salts. As one an example, mixing about 1.8 kilogram (4 pounds) of calcium hydroxide, to a mixture of about 50 percent water and about 50 percent glycerol in a 190 liter (50 gallon) barrel. It is recognized that the amounts of each element of the mixture could be varied without departing from the essence of the subject invention. Likewise, it is recognized that the volume of the described mixture could be linearly scaled up as the volume of exhaust gases increases. The removed mercury and mercuric salts are removed from the reaction chamber 18 through the connection line 54 to the mercury and mercuric salts storage 52.

During the removal of the mercury and mercuric salts from the exhaust gases, calcium carbonate and other salts are formed and amounts of glycerol are still present. The mixture of elements is discharges through connection line 56 to a Calcium Carbonate, other Salts, and Glycerol Storage Unit 58. Portions of the calcium carbonate is separated from the mixture of elements and stored in a separate compartment 60 thereof. Calcium carbonate is passed from the separate compartment 60 to the wet scrubber 14 through the compound connecting line 21'. The calcium carbonate is an important part of the chemical reaction taking place in the wet scrubber 14 as set forth with respect to FIG. 1.

As with respect to FIG. 1, the embodiments of FIGS. 2, 3 and 4, the cleaned exhaust gas may be safely emitted into the atmosphere through the exhaust line 40.

Figure 5:
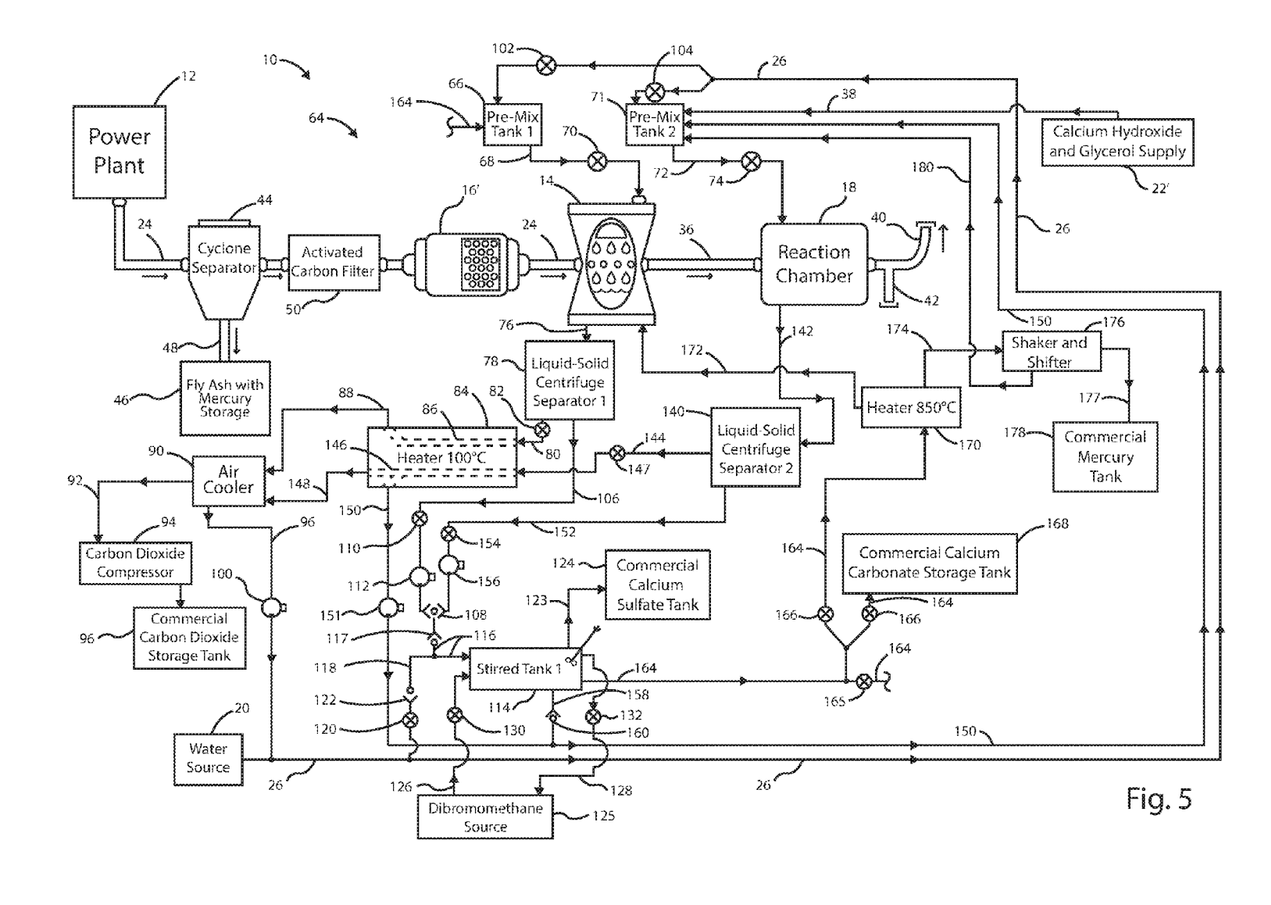
FIG. 5 is a partial flow chart and a partial diagrammatic representation of still another embodiment of the subject design.

With respect to the embodiment illustrated in FIG. 5, as compared to those of FIGS. 1-4, like elements have like element numbers and moved/modified elements have like element numbers with a 'prime' symbol attached thereto. The catalytic convertor 16 is moved to a position upstream of the wet scrubber 14.

The function of the catalytic convertor 16' does not change from that presented in the previous FIG. 1-4. It is recognized that the catalytic converter 16' may be used in different locations without departing from the essence of the subject embodiment. Furthermore, the cleaning fluids, i.e. calcium carbonate, water, and calcium hydroxide are likewise used in this embodiment. If needed to increase the solubility of the calcium hydroxide in water, glycerol may be added.

The exhaust gases are flowing from the catalytic converter 16' through the connecting line 24, through the wet scrubber 14, through the connecting line 36, through the reaction chamber 18 and to the atmosphere through connecting line 40. The wet scrubber 14 uses water and calcium carbonate to remove carbon dioxide and sulfur oxide from the exhaust gases flowing therethrough. Likewise, the wet reaction chamber 18 serves to remove additional carbon dioxide, and mercury, if present in the exhaust gas.

The exhaust gas clean-up system 10 further includes a reclaiming process/system 64. The reclaiming process 64 is based generally on the principle of the solubility of the exhaust gases and products in an aqueous medium and the density of calcium salts.

The reclaiming system 64 includes a first pre-mix tank 66 connected to the wet scrubber 16 through a connecting line 68 to provide cleaning fluid thereto. The cleaning fluid in the first pre-mix tank 66 is water and calcium carbonate. A remotely controlled shutoff valve 70 is disposed in the connecting line 68. A second pre-mix valve 71 is connected to the reaction chamber 18 through a connecting line 72 to provide cleaning fluid thereto. Another remotely controlled shutoff valve 74 is disposed in the connecting line 72. The cleaning fluid in the second pre-mix tank contains calcium hydroxide, water and if needed, glycerol.

A connecting line 76 connects the cleaning fluid from the wet scrubber 16 to a first liquid-solid centrifuge separator 78. The first liquid-solid centrifuge 78 is effective to separate the lighter liquids from the heavier calcium salts based on their respective densities. The lighter liquids are selectively passed through a connecting line 80 having a remotely controlled shutoff valve 82 disposed therein to a first heater 84 being maintained at about 100 degrees C. The lighter liquid is directed through a first passageway 86 of the heater 100. The first heater 84 causes the water and the soluble carbonic acid in the first passageway 86 to vaporize. The vapors are delivered from the first heater 84 via a connecting line 88 to a cooler 90 that is maintained at about 70 degrees C. The cooler 90 condenses the vapor into carbon dioxide and water. The carbon dioxide is passed from the cooler 90 via a connecting line 92 to a carbon dioxide compressor 94 and stored in a commercial carbon dioxide storage tank 96. The water is passed from the cooler 90 and connects with the water connecting line 26 via a connecting line 98. A remotely controlled pump 100 is disposed in the connecting line 98 to ensure that the water source remains pressurized to a predetermined level. Water from the water source 20, is used to supplement, as needed, the water from the cooler 90. The water connecting line 26 selectively delivers the water through respective remotely controlled shutoff valves 102, 104 to the respective first and second pre-mix valves 66,71 and on to the wet scrubber 14 through the connecting line 68 and to the reaction chamber 18 through the connecting line 72.

The heavier calcium salts from the first liquid-solid centrifuge separator 78, in the form of a solution of calcium sulfate and calcium carbonate, are collected and passed through a connecting line 106 to a resolver valve 108. A remotely controlled shutoff valve 110 and a remotely controlled pump 112 are disposed in the connecting line 106. The heavier calcium salts are directed from the resolver valve 108 to a first stirred tank 114 through a connecting line 116. In order to prevent reverse flow in the connecting line 116, a one-way check valve 117 is disposed in the connecting line 116.

A connecting line 118 is connected between the water source connecting line 26 and the connecting line 116 downstream of the one-way check valve 117. The connecting line 118 has a remotely controlled shutoff valve 120 and a one-way check valve 122 disposed therein to control the flow of water from the water connecting line 26 to the first stirred tank 114. A connecting line 123 connects the first stirred tank 114 to a commercial calcium sulfate tank 124.

A Dibromomethane source 125 is provided in the reclaiming system 64 and is connected to the first stirred tank 114 through a connecting line 126. A return connecting line 128 is connected between the first stirred valve 114 and the Dibromomethane source 125. Respective remotely controlled shutoff valves 130,132 are disposed in the respective connecting lines 126,128.

A second liquid-solid centrifuge separator 140 is connected to the reaction chamber 18 through a connecting line 142. The second liquid-solid centrifuge separator 140 is operative to separate the calcium salts from the solution based on density of the respective salts. The lighter liquid from the second solid-liquid centrifuge separator 140 is selectively directed through a connecting line 144 to a second passageway 146 in the first heater 84. A remotely controlled shutoff valve 147 is disposed in the connecting line 144. The elevated temperature of the first heater 84 being maintained at about 100 degrees C. causes the solution in the second passageway 146 therein to vaporize the soluble solution of carbonic acid to form water vapor and carbon dioxide. The vaporized solution of water vapor and carbon dioxide is directed through a connecting line 148 to the cooler 90 wherein the vapors are condensed into carbon dioxide and water. The carbon dioxide is removed and stored in the commercial carbon dioxide storage tank 96 as set above. Likewise, the water therein is returned to the connecting line 26 through the connecting line 96 and the remotely controlled pump 100. If there is any glycerol in the lighter liquid, it will be removed in the heater 100 and returned to the second pre-mix tank 72 through a connecting line 150 having a remotely controlled pump 151 disposed therein. The heavier calcium salts and mercuric salts are removed from the second liquid-solid centrifuge separator 140 and selectively delivered to the first stirred tank 114 through a connecting line 152, a remotely controlled shutoff valve 154, a remotely controlled pump 156, the resolver valve 108, the connecting line 116, and the one-way check valve 117.

The first stirred tank 114 functions to separate the calcium sulfate, calcium carbonate, and the mercuric salts from the selected one of the heavier salts being directed thereto from the first liquid-solid centrifuge separator 78 and the second liquid-solid centrifuge separator 140 through the resolver vale 108. The separation process within the first stirred tank 114 may be accomplish by washing with water at about 30 degrees C. or washed with Dibromomethane from the Dibromomethane source 125. Furthermore, if any glycerol remains in the solution attached to the calcium salts, the solution may be washed with water, prior to the separation process, to remove the glycerol. The water/glycerol mixture is returned to the second pre-mix tank 71 from the first stirred tank 114 through a connecting line 158 to the connecting line 150. The connecting line 158 has a one-way check valve 160 disposed therein to block reverse flow.

During the separation step in the first stirred tank 114, the lighter calcium sulfate is directed through the connecting line 123 to the commercial calcium sulfate storage tank 124. The heavier calcium carbonate and any mercuric salts remaining therein are directed from the first stirred tank 114 through a connecting line 164. The calcium carbonate is selectively directed through the connecting line 164 and respective remotely controlled shutoff valves 165,166,167 too one or more of the first pre-mix tank 66, a calcium carbonate storage tank 168, and a second heater 170 being maintained at about 850 degrees C.

The second heater 170 being operative to chemically break down the calcium carbonate into calcium oxide which could include traces of mercuric salts if present. During the chemical breakdown of the calcium carbonate, carbon dioxide is generated within the second heater 170. The carbon dioxide is removed from the second heater 170 and passed through a connecting line 172 back to the wet scrubber 14 for removal therein. The calcium oxide and any trace amounts mercuric salts, if present, are removed from the second heater 170 and directed through a connecting line 174 to a shaker/sifter 176. The shaker/sifter 176 separates the finer calcium oxide from the more coarse mercuric salts. The mercuric salts are passed from the shaker/sifter 176 through a connecting line 177 to a commercial mercury tank 178. The calcium oxide is passed through a connecting line 180 back to the second pre-mix tank 71 to combine with the water therein and produce more calcium hydroxide for further use in the reaction chamber 18.

Figure 6:
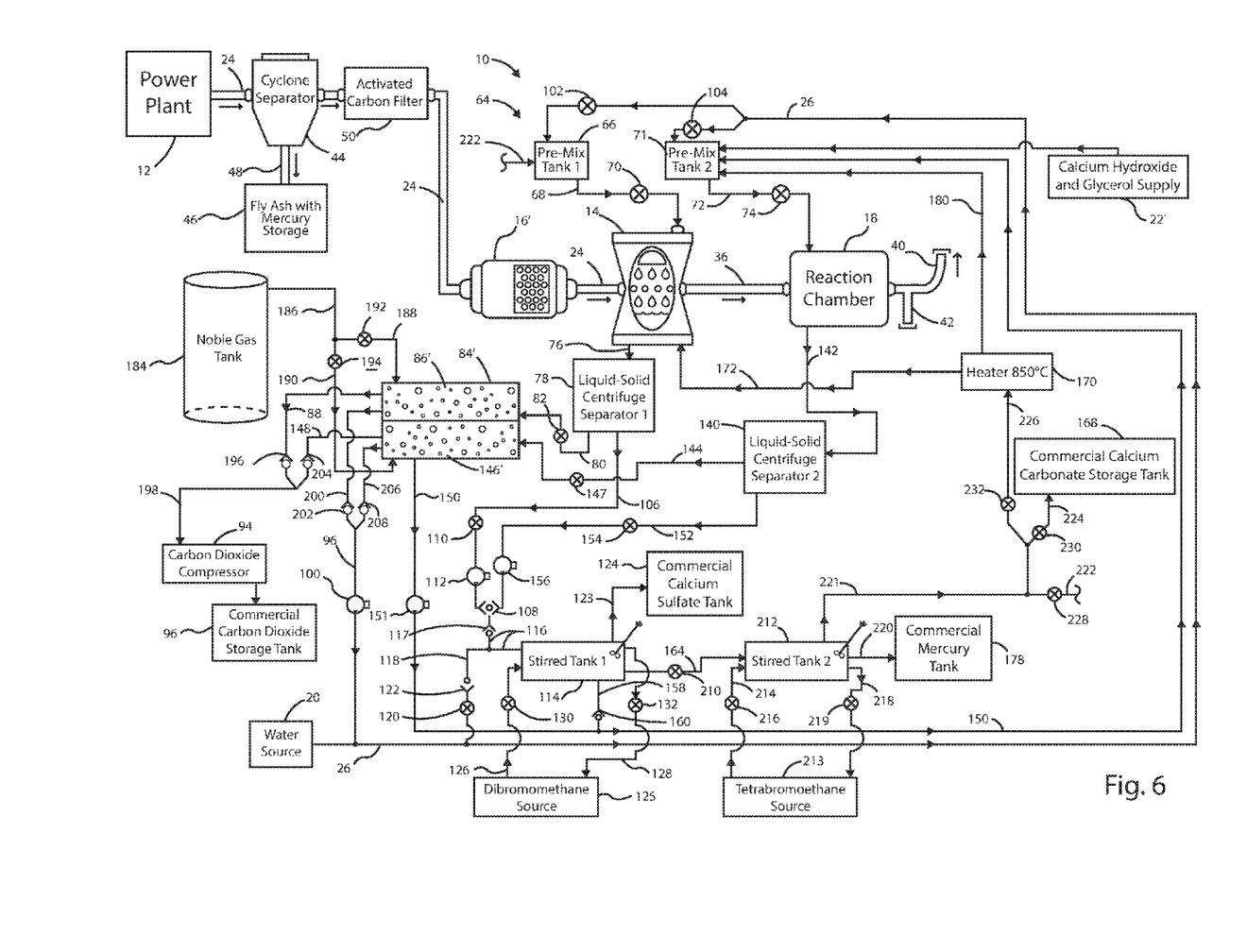
FIG. 6 is a partial flow chart and a partial diagrammatic representation of another embodiment of the concept set forth in FIG. 5.

Referring to the embodiment of FIG. 6, like elements have like element numbers as compared to the previous Figs. FIG. 6 functions in the same manner as that set forth in FIG. 5 but is operative to produce a higher grade of calcium carbonate for sale or reuse.

In FIG. 6, the first and second liquid-solid centrifuge separators 78,140 are connected to the respective wet scrubber 14 and the reaction chamber 18 in the same manner. Likewise, they function in the same to separate the liquids and solids of each in the same manner. In FIG. 6, the first heater 84 being maintained at about 100 degrees C., is replaced with a bubbler tank 84'. The bubbler tank 84' of FIG. 6 has first and second separate compartments 86' and 146' as opposed to first and second separate passageways 86,146. A noble gas tank 184 provides a source of noble gas to the respective first and second compartments 86' and 146' of the bubbler tank 84'. A supply line 186 connects the noble gas to respective first and second compartments 86' and 146' through respective connecting line 188,190. Each of the connecting lines 188,190 has respective remote controlled shutoff valves 192, 194 disposed therein.

Since the reclaiming solution is not heated, there is no need to have the cooler 90 and the connecting line 92. The carbon dioxide is separated from the water by the bubbling action of the noble gas. The carbon dioxide is directed to the carbon dioxide compressor 94 through the connecting line 88, a one-way check valve 196, and a connecting line 198. The water is removed from the compartment 86' through a connecting line 200, a one-way check valve 202, the connecting line 96 and the remotely controlled pump 100 and subsequently selectively delivered to the first and second pre-mix tanks 66,71.

The lighter liquid from the second centrifuge separator 140 is directed to the second compartment 146' of the bubbler tank 84' through the connecting line 144. The carbon dioxide gas that is separated from the water in the second compartment 146' of the bubbler tank 84' is passed to the carbon dioxide compressor through the connection line 148, a one-way check valve 204, and the connecting line 198. The water from the second compartment 86' thereof is directed through a connecting line 206, a one-way check valve 208, the connecting line 96 and the remotely controlled pump 100 and subsequently to the first and second pre-mix tanks 66,71. The respective heavier calcium salts and mercuric salts are selectively passed from the first and second liquid-solid centrifuge separators 78,140 to the first stirred tank 114 in the same manner as that described with respect to FIG. 5.

Any glycerol present in the second compartment 146' of the bubbler tank 84' is pasted back to the second pre-mix tank 71 in the same manner as that of FIG. 5. Likewise, the function of the first stirred tank 114 is the same as that of FIG. 5.

The calcium carbonate and mercuric salts are selectively passed from the first stirred valve 114 through the connecting line 164 and a remotely controlled shutoff valve 210 and into a second stirred tank 212. A source of Tetrabromoethane 213 is selectively connected to the second stirred tank 212 by a connecting line 214 having a remotely controlled shutoff valve 216 disposed therein. A connecting line 218 connects the return flow from the second stirred tank 212 to the source of Tetrabromoethane 213 and has a remotely controlled shutoff valve 219 disposed therein. The heavier mercuric salts are directed through a connecting line 220 to the commercial mercuric tank 178. The lighter calcium carbonate is directed from the second stirred tank 212 through a connecting line 221. The connecting line 221 selectively delivers the calcium carbonate to each of the first pre-mix tank 66 through a connecting line 222, the commercial calcium carbonate storage tank 168 through a connecting line 224, and the heater 170 through a connecting line 226. Respective remotely controlled shutoff valves 228,230,232 are disposed in the respective connecting lines 222,224,226. The calcium carbonate in the connecting line 226 is directed through the second heater 170 that is maintained at about 850 degrees C. Within the second heater 170, the calcium carbonate is broken down into carbon dioxide and calcium oxide. The carbon dioxide is passed back to the wet scrubber 14 through the connecting line 172 to be subsequently removed and the calcium oxide is directed back to the second pre-mix tank 71 where it mixes with the water therein to produce calcium hydroxide that is used in the cleaning process in the reaction chamber 18.

INDUSTRIAL APPLICABILITY

The subject reclaiming process 64 set forth herein for exhaust gas cleanup provides a simple, safe, cost effective and an excellent process for removing various ones of the above noted detrimental compounds/elements from the exhaust of a fossil fuel fired power plant 12.

By directing the exhaust gas from the fossil fuel fired power plant 12 through any of the six embodiments presented herein, the detrimental compounds previously set forth are removed. With respect to FIG. 1, a wet scrubber 14 having a solution of water, calcium carbonate ($CaCO_3$), oxygen ($O_2$), and sulfur dioxide ($SO_2$) therein, the sulfur is chemically removed and the by-product of the gypsum slurry ($CaSO_4(2H_2O)$) is directed to a storage tank 30. During the reaction within the wet scrubber 14, the calcium carbonate ($CaCO_3$), water ($H_2O$), and oxygen ($O_2$) are consumed to convert the sulfur dioxide ($SO_2$) to the gypsum slurry ($CaSO_4(2H_2O)$). Even though the wet scrubber 14 is connected to the remote source of waster 20, the water being produced in the reaction chamber 18 and directed to the wet scrubber 14 through the source compound connection line 21 during the production of the calcium carbonate ($CACO_3$) is normally sufficient.

The chemically modified exhaust gas is passed through the catalytic converter 16 to provide chemical reaction like that of catalytic converters in automobiles. With the exception, the exhaust gases in fossil fuel fired power plants do not contain any appreciable amounts of carbon monoxide and is free of hydrocarbons. As previously stated within the catalytic converter 16, the nitrogen oxides ($NO_2$) converts into nitrogen gas (N) and oxygen ($O_2$). The only things left at this point to treat is carbon dioxide ($CO_2$), nitrogen gas (N), water and oxygen. To reduce the carbon dioxide ($CO_2$) emissions as well as provide calcium carbonate ($CaCO_3$) for the wet scrubber, the exhaust gas is passed through the reaction chamber 18 that has calcium hydroxide ($Ca(OH)_2$ added therein. In the subject embodiment, the volume of calcium hydroxide ($Ca(OH)_2$ needed is approximately 962 g per 2380 L of incoming exhaust gas from the power plant 12. Within the reaction chamber 18, the chemical reaction of the calcium hydroxide ($Ca(OH)_2$ and carbon dioxide ($CO_2$), as set forth above, generates the calcium carbonate ($CaCO_3$) and water as needed in the wet scrubber 14. During this chemical reaction, the carbon dioxide ($CO_2$) level is eliminated or at least reduced to trace amounts. During the chemical reaction within the reaction chamber 18, for every 285.88 L of carbon dioxide ($CO_2$), it requires 953 g of calcium hydroxide ($Ca(OH)_2$. When the exhaust gas from the power plant 12 is low in sulfur, excess calcium carbonate ($CaCO_3$) is being generated in the reaction chamber 18. Consequently, if the exhaust gas from the power plant 12 is higher in sulfur, the extra sulfur can be readily removed due to the extra calcium carbonate ($CaCO_3$) being produced. This would not require extra calcium hydroxide ($Ca(OH)_2$ since the amount of carbon dioxide has not been changed. Furthermore, an additional volume of the by-product gypsum will be produced.

As previously noted with respect to FIGS. 2 and 3, the location of the catalytic converter 16 in the exhaust gas stream is not critical. The function of the catalytic converter 16' remains the same as it was in FIG. 1. The removal of the wet scrubber 14 does not inhibit the removal thereof in most applications since the same function is being performed in the reaction chamber 18. However, it is recognized that the wet scrubber 14 could be utilized as needed.

With respect to the embodiment of FIG. 4, if mercury and mercuric salts and/or large amounts of 'fly ash' are being emitted from the fossil fuel-fired power plant 12, the cyclone gas separator 44 is effective to remove the vast majority of the 'fly ash' and collect the trapped 'fly ash' in the 'fly ash' with mercury storage 46. Much of the mercury and mercuric salts vapors contained in the exhaust gases are absorbed on the surface of the 'fly ash' and removed with the trapped 'fly ash'. Any remaining 'fly ash' is trapped in the activated carbon filter 50 along with mercury and mercuric salts. The combination of the cyclone gas separator 44 and the activated carbon filter 50 effectively remove about 75 percent of the mercury and mercuric salts contained in the exhaust gases.

The solution of calcium hydroxide and glycerol in the calcium hydroxide plus glycerol supply is introduced into the reaction chamber 18 and react with the exhaust gases being directed thereacross. Since the solubility of the calcium hydroxide has been enhanced with the introduction of glycerol, the mercury contained therein is substantially, fully converted to traces of heavier mercuric salts and settles to the bottom of the reaction chamber 18 and stored in the mercury and mercuric salts storage 52 for future processing.

Other products of the chemical reaction within reaction chamber 18, such as calcium carbonate, other salts and glycerol, are passed to the calcium carbonate, other salts and glycerol storage unit 58 for storage and further processing. A portion of the calcium carbonate is separated from the mixture and collected in storage tank 58 and stored in the separate compartment 60. The calcium carbonate is directed from the separate compartment 60 through the compound connection line 21' to the wet scrubber 14 to provide the needed calcium carbonate for the chemical reaction taking place in the wet scrubber 14 as previously set forth in FIGS. 1-3.

This process addresses the issues of nitrogen oxide ($NO_x$) and sulfur oxide ($SO_2$). The process also addresses, in the reaction chamber 18, any carbon dioxide ($CO_2$) present or produced within the process. Nitrogen oxides ($NO_x$) are removed through the catalytic converter 16' and the removal is further enhanced by using platinum as a catalyst and generating nitrogen gas (N). The carbon dioxide ($CO_2$) is removed by reacting it with the calcium hydroxide (Ca$(OH)_2$ to produce the calcium carbonate ($CaCO_3$) that is used in the wet scrubber 14, if provided, or stored in the storage tank 58/60.

With respect to the embodiment of FIG. 5, an apparatus and process 64 is set forth to reclaim compounds and products for reuse and commercial sales. During the operation of the subject system, calcium carbonate, water, calcium hydroxide and if need, glycerol is consumed to clean the exhaust gases from a fossil fired power plant 12. Initially, the exhaust gases from the power plant 12 are passed through the cyclone separator 44 to remove substantially all of the fly ash that may be present along with most of the trace mercuric salts. The exhaust gas from the fossil fuel fired power plant 12 continues through an activated carbon filter 16 to remove substantially all of the remaining 'fly ash' as well as most of the traces of mercuric salts. As the exhaust gases passes through the catalytic converter 16', nitric oxides are removed.

As the exhaust gases continues into the wet scrubber 14, the cleaning fluid in the form of water and calcium carbonate acts on the exhaust gases. The cleaning solution of the reclaiming process 64 is directed into the first liquid-solid centrifuge separator 78 where the centrifuge 78 functions to separate the cleaning solution based on the density of the liquids and salts within the cleaning solution. The light liquid solvents containing basically carbon dioxide and water is directed to the first passageway 86 of the first heater 84 maintained at about 100 degrees. The first heater 84 vaporizes the liquid therein and passes the vaporized solution into the cooler 90 which condenses it into carbon dioxide and water.

The carbon dioxide is passed on to a carbon dioxide compressor 94 and stored in a commercial carbon dioxide storage tank 96. The water in the cooler 90 is directed through the connecting line 96, the pump 100 and further combines with the water source 20 to be selectively reused in the wet scrubber 14 as well as the reaction chamber 18.

The exhaust gases from the power plant 12 continues on to the reaction chamber 18 where a cleaning solution of water and calcium hydroxide acts on the exhaust gases therein. If needed, glycerol is added to the second pre-mix 71, to increase the solubility of the calcium hydroxide in the water. The cleaning solution from the reaction chamber 18 is directed through connecting line 142 to the second liquid-solid centrifuge separator 140. The second liquid-solid centrifuge separator 140 function to separate the lighter liquid therein from the heavier solids and selectively directs the lighter liquid to the second passageway 146 of the first heater 84. The first heater 84 being maintained at about 100 degrees C., once again vaporizes the liquid therein and passes the vaporized liquid to the air cooler 90. In the air cooler 90, the vaporized liquid condenses into carbon dioxide and water. The carbon dioxide passes to the carbon dioxide compressor 94 and is stored in the commercial carbon dioxide storage tank 96. The water is directed from the air cooler 90 through the connecting line 96 and the remotely controlled pump 100 to mix with the water source 20 to selectively feed replacement water to the first and second pre-mix tanks 66,71. Any glycerol present in the second passageway 86 of the second heater 84 is directed back to the second pre-mix tank 71 for reuse.

The heavier solids from the first and second liquid-solids centrifuge separators 78,140 are selectively directed through the resolver valve 108 to the first stirred tank 114. The heavier solids from the first and second liquid-solid centrifuge separators 78,140 are in the form of calcium salts, mercuric salts, and if present, glycerol. If glycerol is present in the cleaning fluid within the first stirred tank 114, the solution needs to be washed with water before proceeding with the next step. Water is selectively directed from the connecting line 26 of the water source 20 through remotely controlled shutoff valve 120, the one-way check valve 122 in the connecting line 118 and into the first stirred tank 114.

During the washing operation, the solution within the first stirred tank remains at rest. The water and washed glycerol returns to the second pre-mix tank 71 through the return connecting line 158, the one-way check valve 160, and the connecting line 150.

Once the washing process is complete, the normal process continues. The heavier solid from the selected one of the first and second liquid-solid separators 78,140 is washed with dibromomethane from the source of dibromomethane 125. The dibromomethane acts on the solution therein to break the solution down into lighter calcium sulfate and heavier calcium carbonate with small amounts of mercuric salts. The dibromomethane is selectively returned to the source 125 thereof through the return connecting line 128. The lighter calcium sulfate is passed on to the commercial calcium sulfate tank 124 while the calcium carbonate with trace mercuric salts if present is selectively directed to one of the first pre-mix tank 66 for reuse, the heater 170 being maintained at 850 degrees C. for further processing, and to the commercial calcium carbonate storage tank 168. It is recognized that the calcium carbonate with small amounts of mercuric salts is not pure enough for all commercial uses but it is pure enough for many practical commercial uses.

The second heater 170 serves to break down the calcium carbonate with some mercuric salts to carbon dioxide and calcium oxide with some mercuric salts. The carbon dioxide is directed to the wet scrubber 14 through connecting line 172 while the calcium oxide with some mercuric salts is directed to the shaker and sifter 176. The shaker and sifter 176 acts to separate the finer calcium oxide from the coarser mercuric salts and sifts the finer calcium oxide to the bottom of the shaker and sifter 176. The mercuric salts are directed to the commercial mercury tank 178 and the finer calcium oxide is directed through the connecting line 180 to the second pre-mix tank 71 to mix with water to form more calcium hydroxide for reuse in the reclaiming process 64.

Referring to the operation of FIG. 6 with respect to the operation of FIG. 5, only the differences will be described below.

The first heater 84 of FIG. 5 is replaced with the bubbler tank 84' and the air cooler 90 is deleted. The connecting line 80 from the first liquid-solid centrifuge separator 78 directs the lighter liquid to the first compartment 86' of the bubbler tank 84'. The first compartment 86' contains a noble gas which acts on the cleaning solution to separate the carbon dioxide from the water and directs the carbon dioxide from the first compartment 86' to the carbon dioxide compressor 94 and the commercial carbon dioxide storage tank 96 through the connecting line 88, the one-way check valve 196 and connecting line 198. Likewise, the connecting line 144 from the second liquid-solid separator 140 directs the lighter liquid therefrom to the second compartment 146' where the carbon dioxide is separated from the liquid and directed through the connecting line 148, the one-way check valve 204, and the connecting line 198 to the carbon dioxide compressor 94 and the commercial storage tank 96. The separated water within the first compartment 86' is directed through the connecting line 200, the one-way check valve 202, the connecting line 96, and the pump 100 and reconnects with the source of water 20 for reuse. In a like manner the separated water within the second compartment 146' is directed through the connecting line 206, the one-way check valve 208 and the connecting line 96 to the pump 100. If there is any glycerol within the second compartment 146', it is removed through the connecting line 150 to the remotely controlled pump 151 and subsequently back to the second pre-mix tank 71 through the connecting line 150.

The first stirred tank 114 functions in the same manner as that with respect to FIG. 5. The calcium carbonate with mercuric salts exiting the first stirred tank 114 is selectively directed through the remotely controlled shutoff valve 210 and the connecting line 164 to a second stirred tank 212. The second stirred tank 212 functions to separate the calcium carbonate from the mercuric salts using a constant velocity agitation followed by a period of rest and separation based on density. This is accomplished by flooding the second stirred tank 212 with Tetrabromoethane during agitation within. The Tetrabromoethane is selectively directed from the source of Tetrabromoethane 213 through the connecting line 214 and the remotely controlled shutoff valve 216. Following the flooded bath, the tetrabromoethane is selectively returned to the Tetrabromoethane source 213 through the connecting line 218 and the remotely controlled shutoff valve 219. The heavier mercuric salts are directed to the commercial mercury tank 178 through the connecting line 220.

The calcium carbonate within the connecting line 221, now free of mercuric salts, is selectively directed to one or more of the first pre-mix tank 66 through the remotely controlled shutoff valve 228 and the connecting line 222, the commercial calcium carbonate storage tank 166 through the remotely controlled shutoff valve 230 and the connecting line 224, and the second heater 170 through the remotely controlled shutoff valve 232 and the connecting line 226. The calcium carbonate, as noted above, is more pure since the mercuric salts have been removed in the second stirred tank 213. Likewise, the more pure calcium carbonate being returned to the pre-mix tank 66 mixes with the water in the pre-mix tank 66 to supply the calcium carbonate cleaning solution needed in the wet scrubber 14.

The heater 170, being maintained at about 850 degrees C., functions to break down the calcium carbonate therein to carbon dioxide and calcium oxide. This step results in removal of any retained oxides. The carbon dioxide is directed through the connecting line 172 to the wet scrubber 14 for removal therein. The calcium oxide is directed through the connecting line 180 to the second pre-mix tank 71. The calcium oxide mixes with the water in the second premix tank 71 to produce additional calcium hydroxide for use in the reaction chamber 18.

Other embodiments as well as certain variations and modifications of the embodiment herein shown and described will obviously occur to those skilled in the art upon becoming familiar with the underlying concept. For example, as previously noted, the catalytic converter 16 could be used in various locations without departing from the essence of the subject invention. Additionally, the first heater 84 could be used in either of the embodiments of FIG. 5 and FIG. 6. Additionally, the bubbler tank 84' could be used in either of the embodiments of FIG. 5 and FIG. 6. Other changes could be readily accomplished without departing from the essence of the subject design. It is to be understood, therefore, that the subject design, as claimed, may be practiced otherwise than as specifically set forth above.

What is claimed is:

1. A process for removing and reclaiming various compounds of calcium carbonate, carbon dioxide, water, mercuric salts, calcium oxide, and calcium sulfate from a cleaning liquid formed during clean-up of exhaust gas in an exhaust gas flowpath from a fossil fuel fired power plant, wherein the exhaust gas clean-up system includes a catalytic converter operative to remove nitrogen oxides, a wet scrubber containing a solution of calcium carbonate and water therein and operative to remove sulfur and carbon dioxide from the exhaust gas in the form of a liquid solution of different salts and carbon dioxide as the exhaust gas is exposed to the solution of calcium carbonate and water, and a reaction chamber operative in a fluid solution of calcium hydroxide and water to remove a fluid solution of various salts of calcium salts and mercuric salts, the process steps comprising:

directing the cleaning liquid solution from the wet scrubber to a first liquid-solid centrifuge separator;

1) selectively directing the lighter liquid within the liquid-solid separator in the form of carbon dioxide and water, through one of a heater at about 100 degrees C. and a bubbler tank containing a noble gas, to separate the carbon dioxide from the water;

2) directing the carbon dioxide to a carbon dioxide compressor and on to a carbon dioxide storage tank for commercial uses;

3) directing the separated water back to the wet scrubber for reuse; and     4) selectively directing the heavier salts containing calcium sulfate, calcium carbonate, and mercuric salts from the liquid-solid separator, through a resolver valve to a first stirred tank; and     directing the cleaning fluid from the reaction chamber to a second liquid-solid centrifuge;

1) selectively directing the lighter liquid from the second liquid-solid centrifuge separator, in the form of water and soluble carbonic acid, through one of another passage in the heater at about 100 degrees C. and another compartment of the bubbler tank, to chemically act on the water and carbonic acid producing carbon dioxide and water;

2) directing the carbon dioxide to the carbon dioxide compressor for storage in the commercial carbon dioxide storage tank;

3) directing the separated water back to the wet scrubber for reuse;

4) selectively directing the heavier salts in the form of calcium salts and mercuric salts from the second liquid-solid centrifuge separator through the resolver valve to the first stirred tank;

5) selecting the one of the heavier salts from the first and second liquid-solid centrifuge separators to pass through the resolver vale;

6) adding one of dibromomethane and water to the various heavier salts in the stirred tank to cause the calcium sulfate to separate from the calcium carbonate, the lighter calcium sulfate floats on the top and is removed and stored in a commercial calcium sulfate tank; and     7) selectively directing the remaining heavier salts in the form of calcium carbonate and trace mercuric salts to one of a commercial calcium carbonate storage tank, the wet scrubber for reuse, a second heater maintained at about 850 degrees C. to separate the calcium carbonate from the mercuric salts, and a second stirred tank to remove the mercuric salts.

2. The process of claim 1 wherein in the step of selectively directing the lighter liquid from the first liquid-solid centrifuge separator, the lighter liquid is directed to the heater at about 100 degrees C. and subsequently to an air cooler to condense the water from the carbon dioxide.

3. The process of claim 1 wherein in the step of selectively directing the lighter liquid from the first liquid-solid separator, the lighter liquid is directed to the bubbler tank containing a noble gas.

4. The process of claim 3, wherein the noble gas is argon.

5. The process of claim 1 wherein in the step of adding one of dibromomethane and water, dibromomethane is added to the first stirred tank.

6. The process of claim 1 wherein in the step of adding one of dibromomethane and water, water at about 30 degrees C. is added to the first stirred tank.

7. The process of claim 1 wherein in the step of selectively directing the remaining heavier salts to one of a commercial calcium carbonate storage tank, the wet scrubber, and a second stirred tank, the heavier salts are selectively directed to the commercial calcium carbonate storage tank and the wet scrubber.

8. The process of claim 1 wherein in the step of selectively directing remaining heavier salts to one of a commercial calcium carbonate storage tank, the wet scrubber and a second stirred tank, the heavier salts is directed through the second stirred tank.

9. The process of claim 8 wherein tetrabromoethane is added to the heavier salts in the second stirred tank to separate the lighter calcium carbonate from the heavier mercuric salts, the lighter calcium carbonate is selectively passed to the wet scrubber, the commercial calcium carbonate storage tank, and a second heater at about 850 degrees C., the heavier mercuric salts are stored in a commercial mercury tank.

10. The process of claim 9 wherein as the calcium carbonate is directed through the about 850-degree C. heater chemically reducing the calcium carbonate to carbon dioxide and calcium oxide, the carbon dioxide is passed back to the wet scrubber for removal and the calcium oxide is directed to the reaction chamber to mix with the water forming more calcium hydroxide.

11. The process of claim 1 in combination with a cyclone separator and an activated carbon filter disposed in the exhaust gas flowpath downstream of the fossil fuel fired power plant and operative to remove fly ash, mercury, and mercuric salts.

12. The process of claim 1 wherein glycerol is added to the reaction chamber and the cleaning liquid solution within the second liquid-solid centrifuge separator is a mixture of glycerol, water and solubilized calcium hydroxide, the lighter liquid solution from the second liquid-solid separator is directed to one of the another passage in the 100 degree C. heater and the another compartment of the bubbler tank in the form of water, glycerol, and water soluble carbonic acid, the glycerol contained in the fluid solution is separated therein and returned to the reaction chamber for reuse in the process.

13. The process of claim 12 wherein the heavier salts from the second liquid-solid separator are in the form of calcium carbonate and mercuric salts with glycerol attached.

14. The process of claim 13 wherein the heavier salts, in the form of, calcium carbonate and mercuric salts with glycerol attached, are directed to the first stirred tank, the heavier salts at the bottom of the first stirred tank are selectively washed with water to remove additional glycerol and the additional glycerol solution is returned to the reaction chamber prior to proceeding with the separation step within the first stirred tank.

15. The process of claim 1 wherein a first pre-mix tank contains the cleaning solution for the wet scrubber and a second pre-mix tank contains the cleaning solution for the reaction chamber, and glycerol is added to the cleaning solution in the second pre-mix tank to increase the solubility of the calcium hydroxide in water.

16. The process of claim 1 wherein in the step of selectively directing remaining heavier salts in the form of calcium carbonate and trace mercuric salts to one of a commercial calcium carbonate storage tank, the wet scrubber for reuse, the heater being maintained at about 850 degrees C., and a second stirred tank, the heavier salts are directed through the second heater where the calcium carbonate is broken down into carbon dioxide and calcium oxide, the carbon dioxide is directed back to the wet scrubber for removal and the calcium oxide along with the mercuric salts are directed through the second heater to a shaker and sifter.

17. The process of claim 16 wherein within the shaker and sifter, the more coarse and heavier mercuric salts are sifted away from the fine calcium oxide and passed to a commercial mercury tank and the powdery calcium oxide is directed back to the reaction chamber where it mixes with water to form additional calcium hydroxide.

* * * * *